United States Patent
Linn et al.

(10) Patent No.: US 10,862,926 B2
(45) Date of Patent: *Dec. 8, 2020

(54) CYBERSECURITY THREAT DETECTION AND MITIGATION SYSTEM

(71) Applicant: Bank of America Corporation, Charlotte, NC (US)

(72) Inventors: Heather Linn, Raleigh, NC (US); Michael Ogrinz, Easton, CT (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/781,118

(22) Filed: Feb. 4, 2020

(65) Prior Publication Data

US 2020/0177636 A1 Jun. 4, 2020

Related U.S. Application Data

(63) Continuation of application No. 16/194,388, filed on Nov. 18, 2018, now Pat. No. 10,630,726.

(51) Int. Cl.
*H04L 29/06* (2006.01)
*G06F 16/951* (2019.01)

(52) U.S. Cl.
CPC ............ *H04L 63/20* (2013.01); *G06F 16/951* (2019.01); *H04L 63/1416* (2013.01); *H04L 63/1441* (2013.01)

(58) Field of Classification Search
CPC . H04L 63/20; H04L 63/1416; H04L 63/1441; G06F 16/951

USPC .......................................................... 726/23
See application file for complete search history.

(56) References Cited

U.S. PATENT DOCUMENTS

| | | |
|---|---|---|
| 6,906,709 B1 | 6/2005 | Larkin et al. |
| 6,963,339 B2 | 11/2005 | Leah et al. |
| 7,890,869 B1 | 2/2011 | Mayer et al. |
| 8,099,787 B2 | 1/2012 | Vasudeva |

(Continued)

OTHER PUBLICATIONS

Strom et al, "Finding Cyber Threats with ATT&CK™-Based Analytics," https://www.mitre.org/sites/default/files/publications/16-3713-finding-cyber-threats%20with%20att%26ck-based-analytics.pdf, The Mitre Corporation, Jun. 2017.

(Continued)

*Primary Examiner* — Teshome Hailu
(74) *Attorney, Agent, or Firm* — Weiss & Arons LLP; Michael A. Springs, Esq.

(57) ABSTRACT

Apparatus and methods are provided for graphically defining a real-world cybersecurity protocol of an entity. The graphical platform includes searchable, manipulatable, graphs mapping cybersecurity threats. Manipulating nodes and relationships within the graphs translates into real-time modification of a cybersecurity protocol in effect for the entity. An ability to map known cybersecurity threats and analyze them (even according to known frameworks) may streamline and integrate efforts of cybersecurity defense teams. Graphical representation of a security protocol facilitates proactive threat hunting as well as expediting incident response activities by providing evidence-based pathways to inform impact analysis and source event analysis.

15 Claims, 5 Drawing Sheets

(56) References Cited

U.S. PATENT DOCUMENTS

| | | | |
|---|---|---|---|
| 8,583,583 B1* | 11/2013 | Stachnick | H04L 63/1425 706/52 |
| 8,803,884 B2 | 8/2014 | Bradshaw et al. | |
| 8,984,633 B2 | 3/2015 | Reutter | |
| 9,130,981 B2 | 9/2015 | Yi | |
| 9,609,011 B2 | 3/2017 | Muddu et al. | |
| 10,003,605 B2 | 6/2018 | Muddu et al. | |
| 10,439,996 B2* | 10/2019 | Puri | G06F 21/6272 |
| 2007/0266138 A1* | 11/2007 | Spire | H04L 63/1416 709/223 |
| 2015/0229617 A1* | 8/2015 | Puri | H04L 63/0435 713/171 |
| 2015/0295948 A1 | 10/2015 | Hassell et al. | |
| 2016/0308898 A1 | 10/2016 | Teeple et al. | |
| 2017/0126727 A1 | 5/2017 | Beam et al. | |
| 2017/0126728 A1 | 5/2017 | Beam et al. | |
| 2017/0169230 A1 | 6/2017 | Zheng et al. | |
| 2017/0180394 A1* | 6/2017 | Crofton | G06F 21/64 |
| 2018/0034837 A1 | 2/2018 | Lakhani et al. | |

OTHER PUBLICATIONS

"Introduction and Overview," The MITRE Corporation, Apr. 13, 2018.

"All Techniques from Mobile," https://attack.mitre.org/techniques/mobile/, The MITRE Corporation, Retrieved on Nov. 6, 2018.

"Encyclopedia Search for Definition of Security Protocol," The Computer Language Company Inc., Retrieved on Oct. 16, 2018.

"Draft Cybersecurity Protocol for International Arbitration, Consultation Draft," https://www.arbitration-icca.org/media/10/43322709923070/draft_cybersecurity_protocol_final_10_april.pdf, Retrieved on Oct. 16, 2018.

Strom et al, Mitre ATT&CK™: Design and Philosophy, https://www.mitre.org/sites/default/files/publications/pr-18-0944-11-mitre-attack-design-and-philosophy.pdf, Jul. 2018.

"All Techniques from Mobile," The MITRE Corporation, Retrieved on Oct. 12, 2018.

"Common Cyber Threats: Indicators and Countermeasures," https://securityawareness.usalearning.gov/cybersecurity/data/pdf/Common_Cyber_Threats_Indicators_and_Countermeasures.pdf, Retrieved on Nov. 13, 2018.

* cited by examiner

CYBERSECURITY THREAT DETECTION AND MITIGATION SYSTEM

CROSS REFERENCE TO RELATED APPLICATION

This application is a continuation of U.S. patent application Ser. No. 16/194,388, filed on Nov. 18, 2018, which is hereby incorporated herein by reference in its entirety.

FIELD OF TECHNOLOGY

This application describes a graphical system for cybersecurity threat detection and mitigation.

BACKGROUND

In current enterprise networks, it is unlikely to be able to detect and defend against every method an adversary might use to gain access to networks and systems. Once inside, adversaries hide in the noise and complexity of their target's environment, often using legitimate mechanisms and camouflaging their activities in normal network traffic to achieve their objectives.

Accordingly, it would be desirable to provide systems and methods for improving detection and mitigation of cybersecurity threats. It would be desirable to utilize graphical representations of cybersecurity threats to detect and mitigate such threats.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

The system includes a graphical security protocol. The graphical security protocol may define a cybersecurity protocol deployed across a network. The graphical security protocol may include one or more searchable, manipulatable, intrusion pathways.

An intrusion pathway may logically link tactics, techniques and procedures ("TTPs") used to perpetrate a cybersecurity threat. A cybersecurity threat may include activity that allows or effectuates unauthorized access to systems or information available on a network. Exemplary cybersecurity threats include phishing and spear phishing, malicious code and removable media.

Tactics describe why a particular action is carried out by a cybersecurity threat. Techniques describe what was done to meet the Tactical objective. Procedures describe how the particular action has been carried out by known cybersecurity threats.

Each action taken by a cyber adversary may be described as a TTP. The concept of TTPs may be explained by analogy to a home intruder. A home intruder may be motivated to achieve monetary gain (e.g., adversary motive) and may attempt to gain unauthorized access to the home.

The "tactic" is to gain unauthorized access to the home. To accomplish this, the intruder breaks a window. The "technique" associated with the tactic is entering the home through a window. The "procedure" for accomplishing the technique is by breaking the glass. An intrusion pathway for a home intrusion may include a node that corresponds to the following TTP:

| $TTP_1$ | | |
| --- | --- | --- |
| $Tactic_A$ | $Technique_A$ | $Procedure_A$ |
| Gain unauthorized access to home | Open window | Break glass |

However, the intruder may instead force the window open instead of breaking the glass. This would represent a different TTP node that includes a different procedure than breaking the glass. Such an illustrative node may correspond to the following TTP:

| $TTP_2$ | | |
| --- | --- | --- |
| $Tactic_A$ | $Technique_A$ | $Procedure_B$ |
| Gain unauthorized access to home | Open window | Force open window |

Alternatively, the intruder may enter the home through a door instead of a window. This would represent using a different technique to gain unauthorized access to the home. However, the intruder may use the same procedure as in $TTP_1$. For example, the intruder may break a glass in the door. Such an illustrative node may correspond to the following TTP:

| $TTP_3$ | | |
| --- | --- | --- |
| $Tactic_A$ | $Technique_B$ | $Procedure_A$ |
| Gain unauthorized access to home | Open door | Break glass |

An intruder may attempt to gain unauthorized access to a storefront instead of a home. This would represent a different tactic and may be associated with the same or different techniques/procedures. For example, the intruder may accost a clerk in the store (technique) with a weapon (procedure).

On a computer network, TTPs may be utilized to classify action of a cyber adversary. For example, the cyber adversary may wish to gain access to proprietary information stored on a secure database. The cyber adversary may initiate a phishing campaign to gain unauthorized access to proprietary information. Such a TTP may be look like this:

| $TTP_A$ | | |
|---|---|---|
| $Tactic_C$ | $Technique_C$ | $Procedure_C$ |
| Send a phishing campaign | Use a malicious document | Use a macro-enabled document |

Alternately such a TTP may look like this:

| $TTP_5$ | | |
|---|---|---|
| $Tactic_D$ | $Technique_D$ | $Procedure_C$ |
| Credential access | Credential dumping | Use a database query |

Intrusion pathways (e.g., linked TTPs) may provide a useful way to detect and respond to post-compromise cyber adversary behavior detected on the network. Intrusion pathways may establish relationships between cyber adversary actions and enable analysis of these pathways. Recording relationships between TPPs (e.g., nodes) in a graphical platform may provide actionable intelligence regarding cyber adversary actions and defensive strategies that apply to those actions.

Tactics, techniques and procedures in each node of an intrusion pathway may be described as defined by ATT&CK™ matrices provided by The MITRE Corporation of Annapolis Junction, Md. ATT&CK™ matrices may provide behavioral-based threat models. The various ATT&CK™ matrices (e.g., mobile, enterprise) are hereby incorporated by reference herein.

Using standardized descriptors for TTPs may provide a common language across cyber threat intelligence ("CTI"), red team, hunt, and incident response teams responsible for cybersecurity across the network. For example, methods may include recording TTP associated with known cybersecurity threats using standardized descriptors for TTPs provided by ATT&CK™ matrices.

Methods may include operationally linking recorded/detected TTPs (e.g., based on tactical goals of each TTP) and generating a graphical representation of the recorded/detected TTPs. Based on cybersecurity research and cybersecurity threat modeling (e.g., "red teaming"), methods may include filling gaps in a graphical representation.

A "gap" may refer to details missing in a network defender's understanding of a cybersecurity threat. A gap may be caused due to a network defender's visibility (or lack thereof) of a cybersecurity threat. For example, in the context of a home intruder, a glass break sensor may trigger an alert if a window is broken. A sensor on a safe (storing valuables) may send an alert that a wrong combination has been entered repeatedly indicating the intruder is trying to open the safe.

However, despite knowing (as a result of sensor alerts) about the broken window and attempts to open the safe, there may be a gap as to what happened between a time when the window was broken and the safe was opened. What other rooms in the home did the intruder visit? Are there other items missing from the home that were not stored in the safe? Without additional details (e.g., alerts/evidence), there are gaps in understanding what occurred during the home invasion.

As further example in the context of a home intruder, detection of a broken window and forcing open a safe may be sufficient to conclude that a home invasion occurred. However, it is not possible to know which valuables were taken from the safe (and which may have been left behind) unless the remaining contents of the safe are examined.

In the cybersecurity context there may be gaps in an intrusion pathway. For example, the intrusion pathway may show that $TTP_A$ happened, $TTP_C$ happened and $TTP_A$ happened. However, the intrusion pathway may not include details on how the cyber adversary progressed from $TTP_A$ to $TTP_C$ or from $TTP_C$ to $TTP_A$. The missing details may be due to gaps in available controls—sensors may not be available to detect progression of the cyber adversary from $TTP_A$ to $TTP_C$ or from $TTP_C$ to $TTP_A$.

The missing details may be due to a gap in information despite deploying sensors. For example, sensors may have been deployed to detect progression from $TTP_A$ to $TTP_C$ or from $TTP_C$ to $TTP_A$. However, network defenders may not have received alerts from the deployed sensors. A sensor may not have been set properly to detect the specific action taken by the cyber adversary. Or, the sensors did trigger alters, however, the alerts were not transmitted to the network defenders.

Gaps may be filled based on a projecting an outcome of a particular TTP's success, or projecting a set of subsequent TTPs that detected TTP's may enable.

For example, a live cybersecurity threat may correspond to detection of $TTP_A$, $TTP_D$ and $TTP_F$. However, a gap may exist because there is not enough information to explain how the cyber adversary progressed from $TTP_A$ to $TTP_D$, or from $TTP_D$ to $TTP_F$. To fill this gap in information, an analysis of the live cybersecurity threat may be performed that generates projected options for how a cyber adversary may progress from $TTP_A$ to $TTP_D$, or from $TTP_D$ to $TTP_F$.

Projected options may be generated based on how the live cybersecurity threat has been effectuated using known TTPs, how other cybersecurity threats have been effectuated (which TTPs have been used), how systems on the network are designed, a topology of the network, or any other suitable criteria.

For example, generated projected options for a live cybersecurity threat corresponding to detection of $TTP_A$, $TTP_D$ and $TTP_F$ may include the following illustrative gap-filling intrusion pathways:

1. $TTP_A$>$TTP_H$>$TTP_L$>$TTP_D$>$TTP_F$>$TTP_Q$>$TTP_X$>$TTP_F$;
2. $TTP_A$>$TTP_B$>$TTP_C$>$TTP_D$>$TTP_E$>$TTP_Q$>$TTP_F$; or
3. $TTP_A$>$TTP_Q$>$TTP_Z$>$TTP_D$>$TTP_M$>$TTP_L$>$TTP_F$.

These projected options may be modeled based on intrusion pathways associated with known cybersecurity threats, characteristics of the network, statistical analysis, machine learning, artificial intelligence or any other suitable analytical tool. Based on the generated projected options, a red team may attempt to model these illustrative gap-filling intrusion pathways.

Based on results of the red team modeling, the gap may be filled. When these illustrative gap-filling intrusion pathways are tested, intrusion pathways options that successfully infiltrate the network or other computing environment may be flagged as potential gap-filling intrusion pathways. Project options that fail to infiltrate the network or other computing environment may be rejected as gap-filler for the tested environment.

Methods may include filling gaps based on common intrusion pathways shared across multiple graphical representations associated with multiple cybersecurity threats. Over time, methods may include building a corpus of intrusion pathways associated with cybersecurity threats. The corpus of intrusion pathways may form cybersecurity research used to fill gaps in live graphical representations. The corpus of intrusion pathway may include statistically common intrusion pathways or other recurring patterns.

Methods may also include using the corpus of intrusion pathways to detect and identify relative associations between TTPs (e.g., based on statistical relationship considerations).

Methods may include using the corpus of intrusion pathways to extrapolate, or predict, possible intrusion pathways. Possible intrusion pathways may be extrapolated using standardized descriptors for TTPs provided by ATT&CK™ matrices.

Methods may include determining an ATT&CK™ matrix that is applicable for a given network or computing environment. Methods may include eliminating implausible/impossible extrapolated intrusion pathways that are not applicable for a given network or computing environment.

Extrapolating possible and plausible intrusion pathway options may generate a knowledge base of predictive "unknowns" that facilitate proactive incident response and cybersecurity threat hunting. For example, methods may include proactively searching for possible intrusion pathways. Detecting of such possible intrusion pathways may indicate that a cybersecurity threat is present on a network or computing environment.

Methods may include initiating incident response based on predicted intrusion pathways. Such incident response may include preemptively deploying countermeasures on a system that has not yet been compromised by a cybersecurity threat. However, based on an intrusion pathway, the system may be at risk of being infiltrated by the cybersecurity threat.

Methods may include associating activity indicators with each TTP included in a graphical representation. Methods may include associating a linked sequence of activity indicators with each TTP. The linked sequence of activity indicators may correspond to a chain of events that achieve a tactical goal represented by the TTP.

A linked sequence of activity indicators, like a graphical representation of TTPs, may include multiple pathways that branch off from a node (e.g., a single TTP or single activity indicator). For each TTP included in a graphical representation or specific intrusion pathway, methods may provide pivoting to the activity indicator (or sequence of activity indicators) associated with that TTP.

Methods may include building cybersecurity threat detection analytics. For example, an intrusion pathway may indicate that when activity indicators associated with $TTP_A$, $TTP_B$, $TTP_C$ and $TTP_D$ are detected (in sequential order), a cybersecurity threat has been detected. Another illustrative analytic may include examining data traffic sizing (over time) between a source and a destination.

An investigative alert may be triggered in response to detecting anomalies in the examined data traffic sizing. The anomalies in the data traffic may be detected based on activity indicators associated with an intrusion pathway. The anomalies in the data traffic may be detected based on data traffic signatures associated with known cybersecurity threats. The investigative alerts may trigger further defensive responses, such as deploying countermeasures.

Logically linked intrusion pathways may facilitate proactive threat hunting by providing evidence-based pathways to inform impact analysis and source event analysis. An intrusion pathway may logically link TTPs known to have been used in connection with cyber-adversarial behavior. An intrusion pathway may include common chains of two or more TTPs known to have been used in connection with cyber-adversarial behavior.

Methods for detecting and remediating a cybersecurity threat on a network are provided. The methods may include detecting a live cybersecurity threat on the network. The methods may include generating a plurality of TTPs for effectuating the live cybersecurity threat detected on the network. The plurality of TTPs may be generated based on access controls currently in place to prevent the live cybersecurity threat. The plurality of TTPs may be generated based on access controls (or other security protocols) currently in place to prevent a known cybersecurity threat that has infiltrated other networks.

The method may include generating a current or live graphical representation of the plurality of TTPs. The live graphical representation may be based on an operational sequence for effectuating the live cybersecurity threat. An operational sequence may be determined based on TTPs associated with known cyber security threats. An operational sequence may be determined based on projections formulated based on mathematical analysis of available security research. An operational sequence may be determined based on analysis of activity indicators that triggered detection of the live cybersecurity threat. The operational sequence may be determined based on a perceived target or purpose associated with the live or current cybersecurity threat.

Methods may include searching for commonalities between the live graphical representation and historical graphical representations of TTPs associated with historical cybersecurity threats. The historical cybersecurity threats may include known cybersecurity threats that have infiltrated other networks.

Based on the commonalities, the methods may include determining missing TTPs absent from the live graphical representation. For example, a hunt team that discovered the live or current cybersecurity threat may not have diagnosed or discovered all of the TTPs needed to be implemented to successfully carry out the live cybersecurity threat.

In some embodiments, by conducting cybersecurity threat research and practically modeling intrusion pathways (red team analysis), it may be possible to explore these gaps with probable/predictive data to bolster hunting/incident response and fill in missing TTPs. Such probable/predictive data may include generating possible intrusion pathways. Missing TTPs and/or possible intrusion pathways may be generated based on artificial intelligence and machine learning techniques.

Based on the commonalities with other known cybersecurity threats or on security research, potential missing TTPs may be identified. The missing TTPs may be identified even though activity indicators demonstrating the presence of these missing TTPs has not yet been discovered by the hunt team on the network. Based on the commonalities, methods may include identifying common TTPs shared by historical graphical representations and graphical representations of the live cybersecurity threat. Such common TTPs may be assigned a higher priority by network defenders.

The methods may include reformulating the live graphical representation to include the missing TTPs. Adding the missing TTPs may direct a hunt team to explore systems and procedures that may not have otherwise been flagged as perpetrating the live cybersecurity threat. The methods may include reformulating the live graphical representation to prioritize common TTPs. By identifying TTPs that are shared by multiple cybersecurity threats, limited detection and mitigation resources may be focused on TTPs that render the network vulnerable to multiple cybersecurity threats.

All TTPs that describe a particular cybersecurity threat may be logically linked to form an intrusion pathway. For example, in the case of a cybersecurity threat that includes malicious code, an illustrative intrusion pathway may include a cyber adversary sending an email to an unsuspecting user that includes an attachment, prompting the unsuspecting user to download the attachment, establishing a presence on the user's system, leveraging the presence on the user's system to gain access to other systems on the network, obtaining target information stored on a secure database on the network, and transmitting that obtaining target information to a remote location.

Consider an illustrative intrusion pathway that includes a linked sequence of TTPs that does not necessarily include all of the TTPs, or cyber adversary's actions. For example, the attack chain may only include gaining access to other systems on the network, obtaining target information stored on a secure database on the network, and transmitting that information to a remote location.

By looking for linked sequences of TTPs (e.g., attack chains) that are common across cybersecurity threats, such common linked sequences of TTPs may drive priority on controls selection, implementation, and mitigations. Furthermore, by examining the number or type or commonalities in linked sequences of TTPs across multiple intrusion pathways, it is possible to estimate an impact of the success of a given TTP.

For example, network defenders may have countermeasures that successfully mitigate those common cyberattack sequences. Alternatively, network defenders may be aware that effective countermeasures to mitigate those common cyberattack sequences are not available.

For each TTP included in the reformulated, live graphical representation, methods may include generating one or more target activity indicators.

An activity indicator may be an observable artifact or combination of observable artifacts resulting from known cybersecurity threat activity. In other words, an activity indicator may be what remains observable after execution of malicious software or activity. Activity indicators may include a digital signature associated with routine and benign system operation. An activity indicator may include two or more activity indicators. For example, malicious activity may be identified based on activity indicators associated with two or more system operations.

The target activity indicators, if observed on a system on the network, may provide operational evidence that one or more of the TTPs included in the reformulated, live graphical representation were executed on the system. In a preferred embodiment, methods may include crawling through the network and detecting linked patterns of TTPs included in the reformulated, live graphical representation. Methods may also include crawling through the network and detecting systems that include one or more of the target activity indicators associated with TTPs in a graphical representation (original or reformulated, live or historical).

In response to detecting cyber adversary activity, response methods may include deploying countermeasures or other actions specified within automated or manual response defense systems. These actions and countermeasures may be designed to mitigate impact from the live cybersecurity threat. In some embodiments, in response to detecting the target activity indicators, methods may include deploying countermeasures across the network. Countermeasures may be designed to mitigate an impact of the cybersecurity threat.

Countermeasures may include any suitable change to system operation or function that is designed to protect against successful effectuation of a cybersecurity threat. Illustrative countermeasures may include:

Isolating (e.g., physically or logically disconnecting) a system from the network;

Encrypting data;

Prompting users to change their passwords or otherwise update their access credentials;

Turning off automatic downloading of email messages;

Blocking malicious links/IP addresses;

Block all unnecessary communication ports;

Disabling unused protocols and services; and/or

Obtaining and installing current operating system service packs and software patches.

Methods may include ordering the plurality of TTPs as operationally needed to effectuate a live cybersecurity threat. Such an ordering may be independent of specific techniques or procedures used to implement each tactic. The ordering may be independent of a time when each underlying activity indicator occurred.

Operationally, tactics may be associated with a logical order. For example, to gain access to a secure database, first a cyber adversary may need to identify a system that stores the database and then obtain a user name and password to access the system. However, chronologically, the adversary may have obtained the user name and password prior to locating the system storing the database. Chronologically, the adversary may have identified desired documents stored in the secure database before identifying the system storing the database.

Despite such chronological differences, it may desirable from a prevention standpoint to organize TTPs associated with a cybersecurity threat according to their tactics or operational goals. Operational organization may harmonize and streamline communication between CTI, red team, hunt, and incident response teams responsible for cybersecurity across the network.

Each TTP may be represented as a node on the live graphical representation embodying the security protocol in effect across the network. Each node thus represents an action taken by a cyber adversary as to effectuate a cybersecurity threat. The graphical representation of such TTPs is designed to granularly describe end-to-end actions taken during a specific cybersecurity threat.

The plurality of TTPs associated with a live cybersecurity threat may be determined based on behavioral progress needed to effectuate the live cybersecurity threat. Behavioral progress may consider how a cyber adversary has or is operating on the network. For example, pre-existing cybersecurity measures deployed across the network may force a cyber adversary to operate in a roundabout manner to achieve each of the TTPs associated with the live cybersecurity threat. In view of the pre-existing cybersecurity measures, additional TTPs may be added to the graphical representation. In view of the pre-existing cybersecurity measures, additional TTPs may be removed from the graphical representation.

Methods may include determining that one or more of the plurality of TTPs associated with to the live cybersecurity threat are absent from the historical graphical representations. Methods may include linking the absent TTPs to the historical graphical representations.

Methods may include, based on the live graphical representation, generating an intrusion pathway showing progression of the live cybersecurity threat through systems on the network. Based on the commonalities and the intrusion pathway, methods may include identifying a target system on the network. The target system may be deemed susceptible to being infiltrated by one or more TTPs associated with the live cybersecurity threat. The target system may be linked to one or more systems that included activity indicators on the intrusion pathway.

Methods may include deploying a countermeasure to secure the target system from being infiltrated using one or more TTPs associated with the live cybersecurity threat. For example, based on the intrusion pathway, methods may include identifying an operational entry point for the live cybersecurity threat system to access the network. Methods may include securing one or more target systems on the network that provide the operational entry point.

Methods for detecting and remediating a cybersecurity threat on a network are provided. Methods may include detecting a compromised system on a network. The network may be compromised due to infiltration by a live cybersecurity threat.

Methods may include determining one or more TTPs needed to effectuate the cybersecurity threat. Methods may include determining one or more activity indicators associated with each TTP. Methods may include linking the plurality of TTPs to each other in a graphical security protocol. The TTPs may be linked in the graphical security protocol based on an operational goal associated with each TTP.

Methods may include searching for a seed system on the network. The seed system may include a first activity indicator. In the field of information security, technologists may refer to detecting a seed system as identifying the origin of compromise. An origin of compromise may be considered "node zero" in a graphical representation of a cybersecurity threat. The first activity indicator may represent activity associated with a TTP that triggered detection of the live cybersecurity threat. The first activity indicator may represent activity associated with a TTP that is known to be associated with effectuating the live cybersecurity threat.

In response to detecting the seed system, methods may include searching for a second system on the network linked to the seed system. The second system may be detected because it exhibits a second activity indicator associated with a TTP directly linked to the TTP associate with the first activity indicator (within the graphical security protocol).

In response to detecting the second activity indicator, methods may include deploying a countermeasure on the second system. The countermeasure may be designed to combat a TTP that effectuates the live cybersecurity threat. For example, the countermeasure may require a password to access certain services provided by the second system.

Such a defensive strategy may be referred to as identifying defensive "chokepoints." Defenders responding to the cybersecurity threat may focus on the chokepoints to efficiently remediate the cybersecurity threat. By remediating a chokepoint, network defenders may inhibit a cyber adversary's ability to effectuate subsequent TTPs from that node (e.g., corresponding to the chokepoint) and thereby achieve greater defensive impact against the cybersecurity threat.

Based on links between the plurality of activity indicators associated with TTPs included in a graphical security protocol, methods may include searching for a third system. The third system may be indirectly linked to the seed system. The third system may be flagged because it exhibits a third activity indicator that is associated with a TTP, positioned within the graphical security protocol, that is operationally ordered after the TTP associated with the second activity indicator. In response to detecting the third activity indicator, methods may include applying a countermeasure to the third system.

The third system may be detected because it exhibits a third activity indicator that is associated with a TTP positioned, within the graphical security protocol, operationally before the TTP associated with the second activity indicator. Because the graphical security protocol links TTPs based on operational and/or behavioral criteria, it may be possible to look "upwards" and locate systems that have been compromised based on TTPs that operationally occur before the TTP and associated activity indicators detected on the seed system.

In some embodiments, methods may include filling in gaps between TTPs in an intrusion pathway. For example, sensors may not be available to detect activity indicators associated with a target TTP. However, TTPs linked to the target TTP and included in the graphical representation, together with an understanding that a cybersecurity threat did occur on the network, may drive additional logical connections between TTPs in the graphical representation and/or provide contextual clues for adding TTPs to the graphical representation and/or maintaining a target TTP within a graphical representation.

In the context of cybersecurity threats, a failure to detect a target TTP does not necessarily require changing the graphical representation. A graphical representation may be used for extrapolation and interpolative analysis of cybersecurity threats rather than exclusively as an explicit roadmap.

In some embodiments, in response to a failure to detect second activity indicator associated with a target TTP, methods may include reordering the linking of the plurality of TTPs to each other. For example, one cannot be certain that an initial operational sequence of TTPs is correct for a given live cybersecurity threat. A failure to locate TTPs (based on detectable activity indicators) that follow the initial operation sequence of TTPs may indicate that further analysis is needed to determine the operational sequence associated with a live cybersecurity threat. The live cybersecurity threat may not operate in accordance with known, previously detected cybersecurity threats.

Reordering the linking of TTPs may include creating a new intrusion pathway for the live cybersecurity threat based on observable activity indicators. The observed activity indicators may be associated with TTPs, which may then be operationally ordered to form a new intrusion pathway. Reordering may include adding TTPs to form the graphical security protocol for the live cybersecurity threat. Reordering may include removing TTPs to form the graphical security protocol for the live cybersecurity threat.

After making changes to the graphical security protocol for the live cybersecurity threat, methods may include searching for systems on the network that exhibit an activity indicator directly linked to the first activity indicator associated with one or more TTPs in the graphical security protocol.

Methods may include searching for commonalities between a graphical representation (e.g., security protocol) associated with a live cybersecurity threat and one or more historical graphical representations. The one or more historical graphical security protocols may store TTPs generated based on multiple cybersecurity threats. The multiple cybersecurity threats may include known cybersecurity threats.

Based on the commonalities, methods may include identifying target intrusion pathways. The target intrusion pathway may be common across two or more cybersecurity threats. For example, target TTP intrusion pathways may be those present in two or more graphical security protocols. Target intrusion pathways may be those associated with two or more cybersecurity threats.

Methods may include deploying sensors to detect the target TTP intrusion pathways. For example, the graphical security protocol may indicate that a target intrusion pathway associated with activity indicators previously considered difficult to detect is now being utilized by multiple cybersecurity threats. In view of the increased usage of the target intrusion pathway, it may now be worthwhile to create and deploy a sensor for detecting activity indicators associated with the target intrusion pathway.

Methods may include deploying one or more countermeasures to secure systems on the network that exhibit a target intrusion pathway.

Apparatus for detecting and mitigating a cybersecurity threat on a network of interconnected computer systems are provided.

Generally, apparatus may include a processor circuit. The processor circuit may control overall operation of the apparatus and its associated components. The apparatus may be a system on the network. The processor circuit may include hardware, such as one or more integrated circuits that form a chipset. The hardware may include digital or analog logic circuitry configured to perform any suitable (e.g., logical) operation.

For example, apparatus may include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, or quantify indices; and machine-readable memory.

Machine-readable memory may be configured to store, in machine-readable data structures: graphical data structures, intrusion pathways, or any other suitable information or data structures. Components of the apparatus may be linked by a system bus, wirelessly or by other suitable interconnections. Apparatus components may be present on one or more circuit boards. In some embodiments, the components may be integrated into a single chip. The chip may be silicon-based.

The apparatus may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor that enable the apparatus to perform various functions. For example, the non-transitory memory may store software applications such as an operating system, application programs, and an associated database. Some or all of computer executable instructions of the apparatus may be embodied in hardware or firmware components of the apparatus.

Apparatus may include cloud computing and virtualization implementations of software. Such implementations may be designed to run on a physical apparatus supplied externally by a hosting provider, a client, or other virtualized platform.

Software application programs, which may be used by the apparatus, may include computer executable instructions for invoking user functionality related to communication, such as email, short message service ("SMS"), and voice input and speech recognition applications. Software application programs may utilize one or more algorithms that formulate graphical data structures, search the graphical data structures, process received executable instructions, detect activity indicators, or any other suitable tasks.

Sensors may be deployed to detect activity indicators associated with a TTP or an intrusion pathway (two or more linked TTPs). Sensors may be hardware sensors. Sensors may be software sensors. Sensors may support establishing network connections to one or more remote computers or networks. Illustrative network connections may include a local area network ("LAN") and a wide area network ("WAN"), and may also include other networks. When used in a LAN networking environment, apparatus may be connected to the LAN through a network interface or adapter. Apparatus may include a communication circuit. The communication circuit may include a network interface card or adapter.

When used in a WAN networking environment, apparatus may include a modem, antenna or other circuitry for establishing communications over a WAN, such as the Internet. The communication circuit may include a modem and/or antenna.

The existence of any of various well-known protocols such as TCP/IP, Ethernet, FTP, HTTP and the like is presumed, and apparatus may be operated in a client-server configuration to permit a user to retrieve web pages from a web-based server. Web browsers can be used to display and manipulate data on web pages.

Apparatus may include various other components, such as a display, battery, speaker, and antennas. Network connected systems may be portable devices such as a laptop, tablet, smartphone, other "smart" devices (e.g., watches, eyeglasses, clothing having embedded electronic circuitry) or any other suitable device for receiving, storing, transmitting and/or displaying electronic information.

Apparatus may include, and may be operational with, numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, "smart" devices (e.g., watches, eyeglasses, clothing having embedded electronic circuitry) mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Apparatus may utilize computer-executable instructions, such as program modules, executed by a processor. Generally, program modules include routines, programs, objects, components, data structures, etc. that perform particular tasks or implement particular abstract data types. Apparatus may be operational with distributed computing environments where tasks are performed by remote processing devices that are linked through a communications network.

In a distributed computing environment, program modules may be located in both local and remote computer storage media including memory storage devices. Apparatus may rely on a network of remote servers hosted on the Internet to store, manage, and process data (e.g., "cloud computing" and/or "fog computing").

Apparatus may include a battery. The battery may be a power source for electronic components of the apparatus. For example, the battery may supply power to the display, the communication circuit and the processor circuit. In some embodiments, apparatus may include a plurality of batteries. Apparatus may include solar panels that convert solar energy into electricity that power one or more components of the apparatus.

Figure 1:
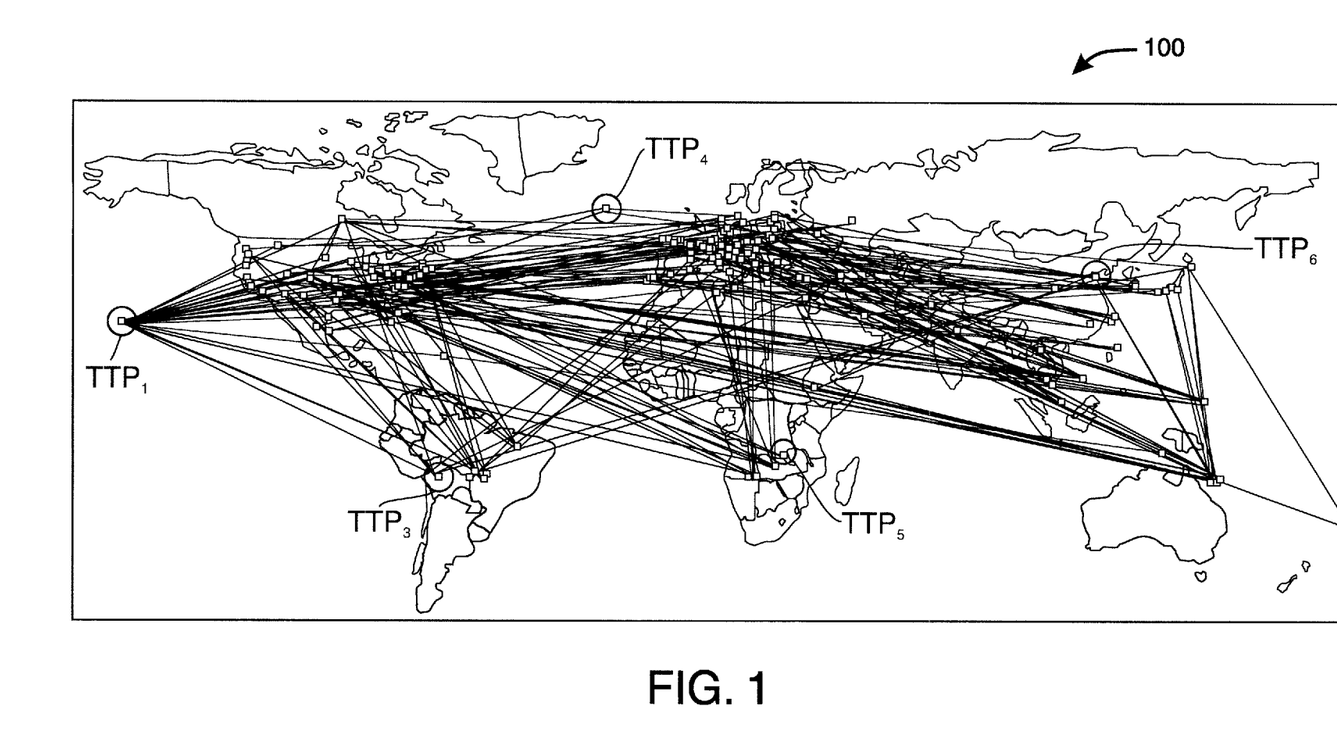
FIG. 1 shows an illustrative system architecture in accordance with principles of the disclosure.

System included in architecture 100 may be produced by different manufacturers. Apparatus may capture data in different formats. For example, apparatus may use different data structures to store captured data. Apparatus may utilize different communication protocols to transmit captured data or communicate with other systems. Despite such operational differences, apparatus may be configured to operate substantially seamlessly to detect cybersecurity threats across different systems operating on the network. Interoperability may allow captured data to be substantially seamlessly captured and linked in one or more graphical security protocols. Based on interpreting the captured data stored in the graphical security protocols, apparatus may deploy or devise countermeasures for mitigating or arresting detected cybersecurity threats.

The apparatus may include a graphical security protocol. The graphical security protocol may be a security protocol in effect for a network. The graphical security protocol may include a plurality of TTPs. Each TTP included in the graphical security protocol may be operationally linked to at least one other TTP. The links between the TTPs may represent operational steps taken by a cybersecurity threat to achieve an objective of the cybersecurity threat.

The links between TTPs may change as more information about a live cybersecurity threat is detected. For example, revising a tactical objective of a live cybersecurity threat may alter connections between TTPs associated with the tactical objective. Altering connections between TTPs (e.g., nodes in a graphical security protocol) may translate into real-time modification of the cybersecurity protocol.

Modifying the graphical security protocol may also change strategy for detecting and mitigating cybersecurity threats. For example, altering connections between different TTPs may change which systems on the network are searched for activity indicators associated with each TTP.

Manipulating links between TTP nodes and relationships within the graphical platform may translate into real-time modification of the security profile in effect across the network. Apparatus may be configured to operationally link the plurality of TTPs included in the graphical security profile to each other operationally based on graphical security profiles associated with known cybersecurity threats. For example, the processor may link the plurality of TTPs to each other based on one or more ATT&CK™ matrices.

Apparatus may be configured to monitor performance on the interconnected subsystems on the network for one or more of the TTPs stored in the graphical security protocol. In response to detecting a first activity indicator of a first TTP exhibited by a first compromised system, the apparatus may search for one or more activity indicators associated with a second TTP operationally linked to the first TTP.

Based on detecting activity indicators associated with the second TTP, the apparatus may form an intrusion pathway. The intrusion pathway may indicate a logical pathway (and associated TTPs) leveraged by a cybersecurity threat to infiltrate the network.

Network defense tools, guided by the intrusion pathway, may deploy a countermeasure on the network to mitigate an impact of the cybersecurity threat. For example, apparatus may deploy countermeasures on systems that have registered presence of the activity indicators included in TTPs of intrusion pathway. Apparatus may prioritize deployment of countermeasures designed to secure against a high priority TTP included in the intrusion pathway. A TTP may be considered a high priority TTP if it is common to two or more known cybersecurity threats.

The apparatus may be configured to determine that a known cybersecurity threat includes a TTP that is not included in the intrusion pathway for the live cybersecurity threat.

In a preferred embodiment, in response to detecting a difference between intrusion pathways associated with known cybersecurity threats and a live cybersecurity threat, apparatus may be configured to generate a new graphical representation for the live cybersecurity threat. Creating a new graphical representation may maintain integrity of intrusion pathways of the known cybersecurity threat and live cybersecurity threat. Maintaining information integrity of intrusion pathways, as detected, provide for reliable statistical comparison of detected TTP patterns, as they have been observed (e.g., in situ), in connection with the known cybersecurity threat.

In some embodiments, in response to detecting a TTP present in an intrusion pathway associated with a known cybersecurity threat and missing from an intrusion pathway associated with a live cybersecurity threat, apparatus may be configured to add the missing TTP to the intrusion pathway associated with the live cybersecurity threat and thereby form an extended intrusion pathway. The processor may search, within the network for a subset of systems that, collectively, include activity indicators associated with TTPs included in the extended intrusion pathway.

In response to detecting a target intrusion pathway of linked TPPs included in the extended intrusion pathway, apparatus may register the network as being vulnerable to the attack chain. In response to detecting the target intrusion pathway, the processor may deploy countermeasures to secure the network against the target intrusion pathway.

The processor may further be configured to categorize each system on the network that exhibits one or more of the threshold activity indicators (included in TTPs of the intrusion pathway) as a compromised system. The processor may search within the network for an uncompromised system linked to the compromised systems. The uncompromised system may not exhibit any of the activity indicators associated with TTPs in the intrusion pathway. However, by virtue of being linked to a compromised system, the uncompromised system may be at a higher risk of being infiltrated by the live cybersecurity threat. The processor may deploy countermeasures to secure the uncompromised system against the activity indicators included in the intrusion pathway and thereby arrest propagation of the cyber-adversarial behavior on the network.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with another illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus and/or method embodiment.

FIG. 1 shows an illustrative network 100. Network 100 may include multiple systems that operate in different geographic locations and across different time zones. Each system may be exposed to different cybersecurity threats. Systems in network 100 may be exposed to different cybersecurity threats based on operational properties of a system. Systems in network 100 may be exposed to different cybersecurity threats based on geographic location of a system.

FIG. 1 shows that network 100 has been infiltrated by a cybersecurity threat that includes six TTPs—TTP$_1$, TTP$_2$, TTP$_3$, TTP$_4$, TTP$_5$ and TTP$_6$. The six TTPs may be linked to each other in an intrusion pathway. A presence of a TTP on the network may be detected based on activity indicators associated with each of the six TTPs.

Graphical security protocols based on an intrusion pathway linking the six TTPs may provide accurate and efficient methods for discovering other live cybersecurity threats on network 100. Graphical security protocols based on the intrusion pathway may provide accurate and efficient methods for discovering other systems on network 100 that may have been compromised by a cybersecurity threat that includes the six TTPs.

For example, a behavioral analysis may be conducted on the cybersecurity threat that compromised network 100. The behavioral analysis may attempt to identify additional TTPs associated with the cybersecurity threat. Initially only a limited amount of information may be available. For example, the cybersecurity threat may have been detected based on a system on network 100 attempting to transfer files to a remote system not part of the network. Based on the attempted file transfer, the six TTPs may be identified and ordered in an intrusion pathway. The six TTPs may be identified based on a behavioral and/or operational analysis of steps that were likely taken to allow an adversary to infiltrate the compromised system and attempt the detected file transfer.

Figure 2A:
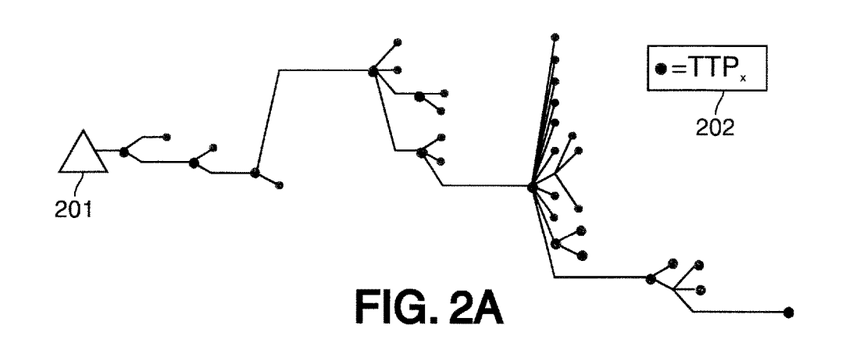
FIGS. 2A-2D show illustrative arrangements of interconnected nodes in accordance with principles of the disclosure.

FIG. 2A shows an illustrative intrusion pathway of linked TTPs that originates with TTP 201. The group of TTPs that form the intrusion pathway shown FIG. 2A includes multiple TTPs that operationally follow TTP 201. Each TTP in the intrusion pathway may be associated with techniques, procedures and/or activity indicators used to effectuate the TTP and a cybersecurity threat.

Figure 2B:
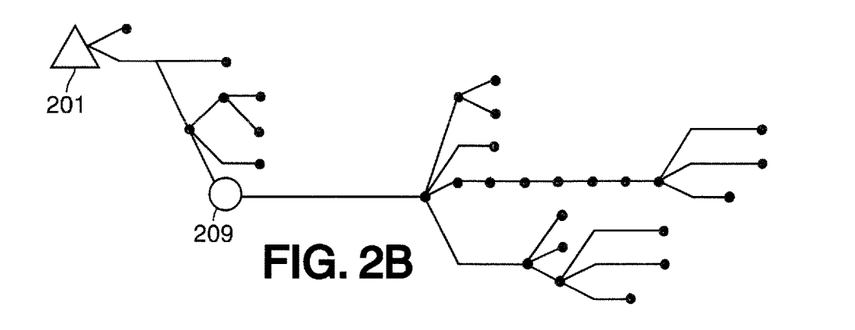

FIG. 2B shows another intrusion pathway that originates with TTP 201. FIG. 2B shows that a TTP may be associated with multiple intrusion pathways. Each intrusion pathway may be associated with a different combination of TTPs. A cyber adversary may utilize different techniques and/or procedures to effectuate a tactical goal. Different combinations of TTPs may yield different intrusion pathways.

Figure 2C:
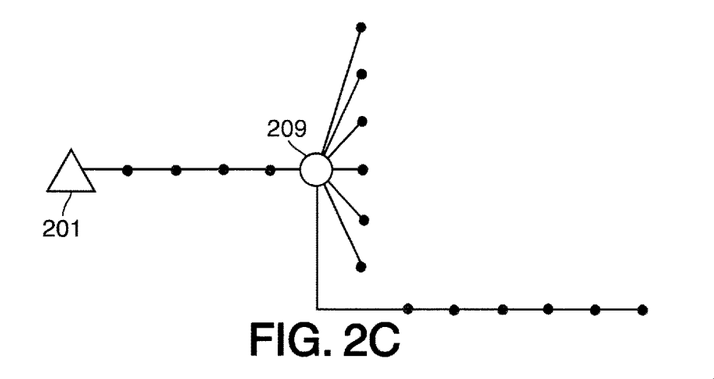
Figure 2D:
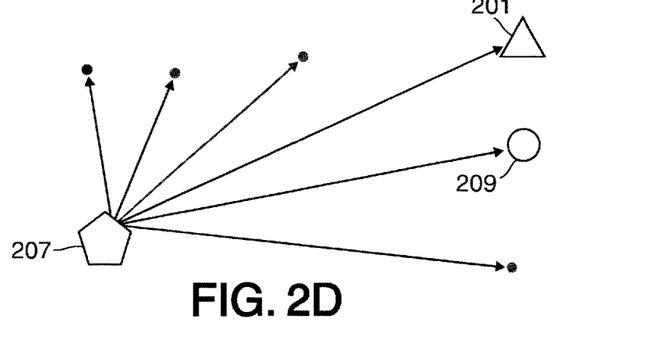

FIG. 2B also shows an intrusion pathway that includes TTP 209. FIG. 2C shows another intrusion pathway that includes TTP 209. FIG. 2D shows another instruction pathway that originates with TTP 207 and includes TTP 209 and TTP 201.

TTP 209 and TTP 201 may be flagged as priority TTPs because they are included in two or more intrusion pathways (e.g., FIGS. 2B and 2C). The intrusion pathways shown in FIGS. 2A, 2B and 2C may each be flagged as priority intrusion pathways because they all include a common TTP—TTP 201.

TTPs 201, 209 and 207 may be linked to each other in a graphical security protocol based on operational and/or behavioral sequencing. For example, FIG. 2D shows that TTP 201 may represent a TTP that that follows after a cyber adversary has successfully achieved an objective associated with TTP 207.

Figure 3:
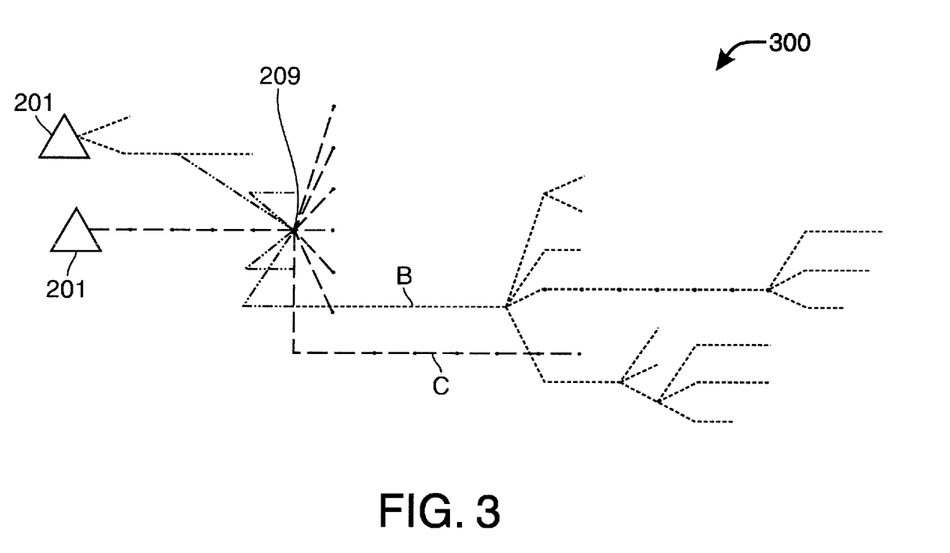
FIG. 3 shows an illustrative arrangement of interconnected nodes in accordance with principles of the disclosure.

FIG. 3 shows illustrative graphical security protocol 300. Intrusion pathways shown in FIGS. 2B and 2C both include TTP 209. Graphical security protocol 300 is a result of merging intrusion pathways shown in FIGS. 2B and 2C about common TTP 209.

Graphical security protocol 300 shows that TTP 209 is common to intrusion pathways that originate with TTP 201. When a cybersecurity defense system detects that TTP 201 is included in an intrusion pathway, the system may prioritize a search for a sequence of TTPs (within the intrusion pathway) that originates with TTP 209. A TTP sequence that originates with TTP 209 may be assigned a higher priority because TTP 209 that is common to two intrusion pathways (e.g., FIGS. 2B and 2C). Deploying countermeasures against TTP 209 and TTP sequences that originate with TTP 209 may arrest effectuation of cybersecurity threats that include TTP 201 and/or intrusion pathways that originate with TTP 209.

A graphical security protocol may show that detecting TTP 209 may prevent multiple cybersecurity threats. Detecting and deploying countermeasures against TTP 209 may arrest effectuation of cybersecurity threats that include intrusion pathways that originate with TTP 201 or TTP 207. Furthermore, if TTP 201 or TTP 207 is detected on a network, the instruction pathways may provide an evidence based pathway that informs a hunt team to search for activity indicators associated with TTP 209.

Figure 4:
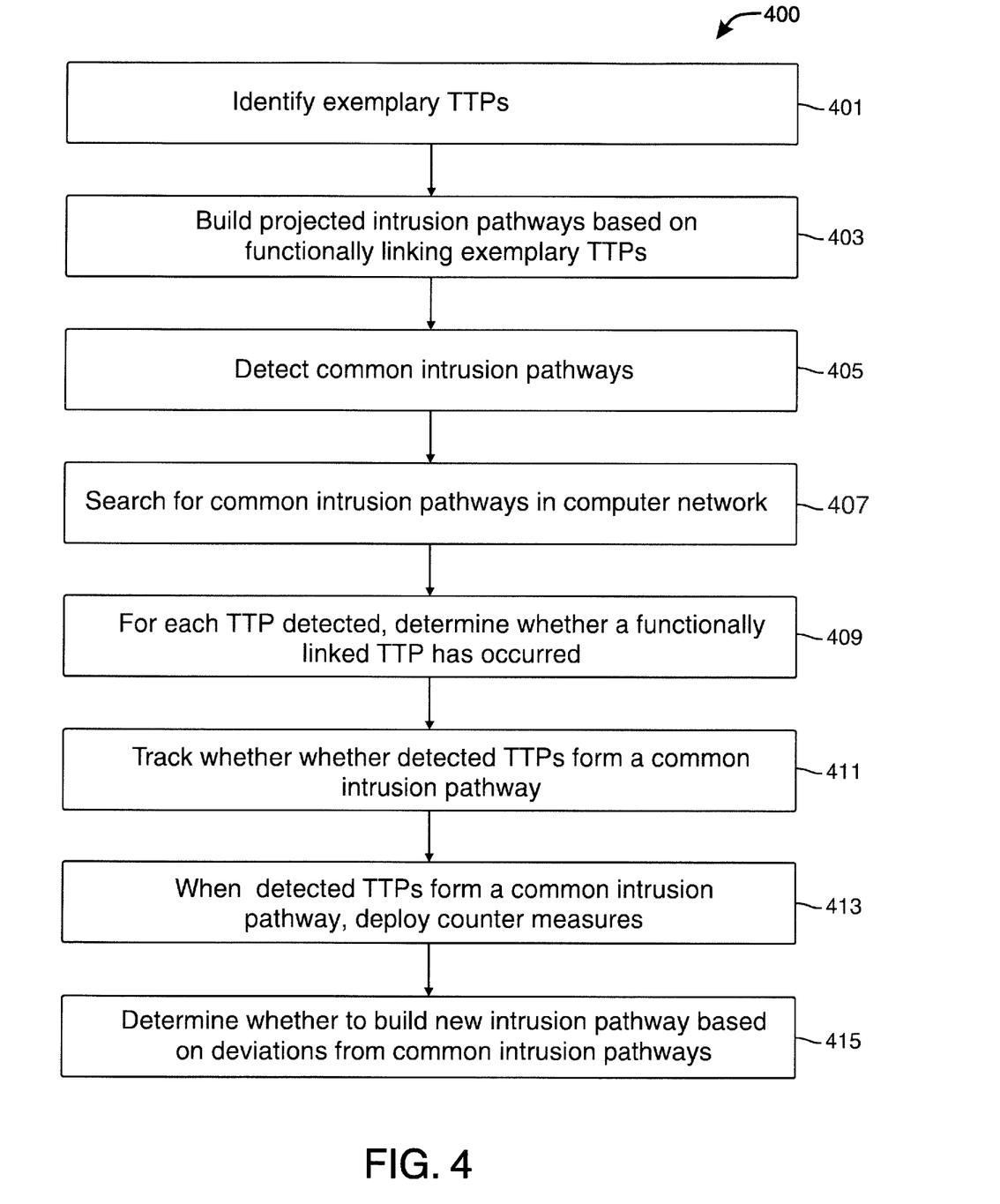
FIG. 4 shows an illustrative process in accordance with principles of the disclosure.

FIG. 4 shows illustrative process 400. For the sake of illustration, one or more of the steps of the process illustrated in FIG. 4 will be described as being performed by a "system." The "system" may include one or more of the features of apparatus (software and/or hardware) or processes described herein and/or any other suitable device or approach.

Process 400 may begin at step 401. At step 401, the system identifies exemplary TTPs. At step 403, the system builds projected intrusion pathways based on functionally linking TTPs that may be used to effectuate a cybersecurity threat.

At step 405, the system searches for common intrusion pathways. The common intrusion pathways may be identified based known cybersecurity threats that share common TTPs. At step 407, the system searches for the common intrusion pathways within a computer network. A common intrusion pathway may be detected based on activity indicators associated with TTPs included in the common intrusion pathway. Altering the connections among TTPs may change a search and detection strategy.

At step 409, for each TTP detected, the system determines whether a functionally linked TTP has occurred. For example, the system may search for an activity indicator associated with a target TTP that operational follows a detected TTP.

At step 411, the system tracks whether detected TTPs form a common intrusion pathway. Cybersecurity threats are typically difficult and time consuming to detect. Detecting common intrusion pathways or TTPs commons across different cybersecurity threats may improve accuracy and speed of detecting cybersecurity threats. For example, common intrusion pathways may provide "go to" search patterns when attempting to detect and/or remediate a cybersecurity threat. Limited defensive resources may be deployed to secure against TTPs included in common intrusion pathways.

At step 413, when TTPs included in a common intrusion pathway are detected, the system deploys counter measures. At step 415, the system determines whether to build a new intrusion pathway based on detected a combination of TTPs that do not fit into a known intrusion pathway. For example, a cybersecurity threat may leverage atypical procedures or combinations of TTPs. The system may monitor for the presence of such anomalous TTP combinations and search for them when responding to a future cybersecurity threat.

Figure 5:
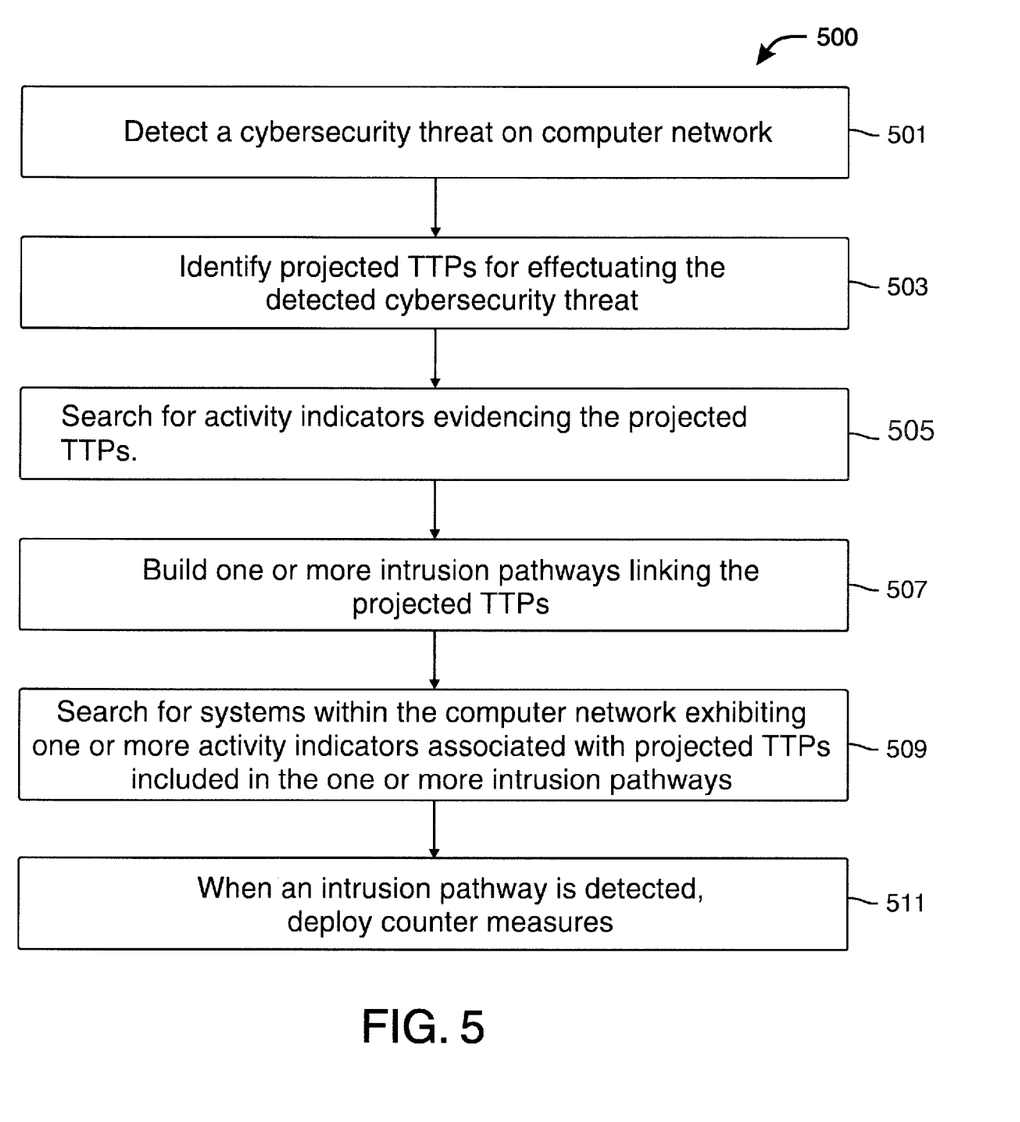
FIG. 5 shows an illustrative process in accordance with principles of the disclosure.

FIG. 5 shows illustrative process 500. For the sake of illustration, one or more of the steps of the process illustrated in FIG. 5 will be described as being performed by a "system." The "system" may include one or more of the features of apparatus (software and/or hardware) or processes described herein and/or any other suitable device or approach.

At step 501, the system detects a cybersecurity threat on computer network. At step 503, based on the detected cybersecurity threat, the system identifies projected TTPs needed to effectuate the detected cybersecurity threat.

At step 505, the system searches within the network for systems that include activity indicators evidencing the projected TTPs. At step 507, in response to detecting the projected TTPs, the system builds one or more intrusion pathways linking the projected TTPs. At step 509, the system searches for systems within the computer network exhibiting one or more activity indicators associated with projected TTPs included in the one or more intrusion pathways.

At step 513, when an intrusion pathway is detected, the system deploys counter measures. Detecting activity indicators associated with TTPs included in an intrusion pathway indicates a presence of an active cybersecurity threat. Detecting activity indicators associated with TTPs included in an intrusion pathway may more likely indicate active cybersecurity threat than normal operational activity associated that may generate an activity indicator of an individual TTP.

Thus, apparatus and methods for a CYBERSECURITY THREAT DETECTION AND MITIGATION SYSTEM have been provided. Persons skilled in the art will appreciate that the present disclosure can be practiced by other than the described embodiments, which are presented for purposes of illustration rather than of limitation. The present disclosure is limited only by the claims that follow.

What is claimed is:

1. A method for detecting and remediating a cybersecurity threat on a network, the method comprising:
   detecting a live cybersecurity threat on the network;
   based on controls in place to detect and prevent the live cybersecurity threat, generating a plurality of tactics, techniques and procedures ("TTPs") for effectuating the live cybersecurity threat;
   projecting additional TTPs for how the live cybersecurity threat may have progressed on the network from one of the plurality of TTPs to another of the plurality of TTPs;
   building one or more intrusion pathways comprising the plurality of TTPs and the additional TTPs;
   linking the intrusion pathways and forming a graphical security protocol;
   for each additional TTP included in the graphical security protocol, generating one or more target activity indicators that if observed on the network, provide operational evidence that one or more of the additional TTPs included in the graphical security protocol are present on the network;
   crawling through the network and detecting the one or more of the target activity indicators associated with the additional TTPs;
   in response to detecting the one or more target activity indicators on the network, deploying at least one countermeasure counter against the additional TTP associated with the one or more activity indicators and thereby mitigate an impact of the live cybersecurity threat;
   based on the graphical security protocol, generating a live intrusion pathway showing progression of the live cybersecurity threat through the network;
   identifying a target system on the network that is positioned on the live intrusion pathway and susceptible of being infiltrated by the live cybersecurity threat; and
   securing the target system from being infiltrated by the live cybersecurity threat;
   wherein the generating of the live intrusion pathway comprises ordering all TTPs included in the graphical security protocol as operationally needed to effectuate the live cybersecurity threat.

2. The method of claim 1 further comprising deploying at least one sensor to detect the target activity indicators.

3. The method of claim 1 further comprising projecting the additional TTPs by modeling known cybersecurity threats as applied to one or more characteristics of the network.

4. The method of claim 1 further comprising linking the intrusion pathways by merging the intrusion pathways about a target TTP common to two or more intrusion pathways.

5. The method of claim 4 further comprising deploying countermeasures against the target TTP and TTPs included in the intrusion pathways that originate from the target TTP.

6. The method of claim 4 further comprising prioritizing the detecting of the additional TTPs that are common to two or more intrusion pathways.

7. The method of claim 1, further comprising applying artificial intelligence and machine learning techniques to generate the additional TTPs before detecting activity indicators demonstrating the presence of the additional TTPs.

8. The method of claim 7, further comprising removing one or more TTPs from the graphical security protocol based on pre-existing cybersecurity measures deployed on the network.

9. The method of claim 1 further comprising, based on the live intrusion pathway:
   identifying an operational entry point on the network for the live cybersecurity threat; and
   securing systems on the network that provide the operational entry point.

10. A method for detecting and remediating a cybersecurity threat on a network, the method comprising:
   detecting a compromised system on the network infiltrated by the cybersecurity threat;
   determining a plurality of tactics, techniques and procedures ("TTPs") for effectuating the cybersecurity threat and one or more activity indicators associated with each TTP;
   projecting additional TTPs for how the live cybersecurity threat may have progressed on the network from one of the plurality of TTPs to another of the plurality of TTPs;
   integrating the plurality of TTPs and the additional TTPs into a live graphical security protocol based on an operational goal associated with each TTP;
   searching for a seed system on the network that includes an activity indicator associated with a target TTP included in the live graphical security protocol;
   in response to detecting the seed system, searching for an uncompromised system on the network linked to the seed system that is vulnerable to at least one of the TTPs included in the live graphical security protocol;
   deploying countermeasures to secure the uncompromised system against one or more of the TTPs in the live graphical security protocol and thereby arrest propagation of the live cybersecurity threat on the network;
   searching for a subset of the TTPs in the live graphical security protocol that include two or more TTPs in common with a historical graphical security protocol associated with a historical cybersecurity threat; and
   deploying countermeasures to secure systems against one or more TTPs included in the subset; wherein, the projecting of the additional TTPs comprises identifying TTPs missing from the plurality of TTPs based on an ordering of TTPs in the historical graphical security protocol.

11. The method of claim 10 further comprising deploying sensors to detect activity indicators associated with the subset of TTPs.

12. The method of claim 10 further comprising:
   searching for target TTPs common to both the live graphical security protocol and the historical graphical security protocol; and
   prioritizing the deploying of at least one countermeasure against the target TTPs.

13. Apparatus for detecting and mitigating a live cybersecurity threat on a network of interconnected computer systems, the apparatus comprising:
   a graphical security protocol in effect for the network, the graphical security protocol comprising a plurality of tactics, techniques and procedures ("TTPs") operationally linked to each other; and
   a microprocessor configured to:
      monitor the interconnected computer systems for a seed system that includes an activity indicator associated with a target TTP included in the graphical security protocol; and
      in response to detecting the seed system:
         deploy at least one countermeasure to secure the seed system against the target TTP;
         project an intrusion pathway for how the live cybersecurity threat may progress from one TTP to another TTP included in the graphical security protocol;
         supplement the graphical security protocol to form an extended graphical security protocol by adding additional TTPs included in the projected target intrusion pathway and absent from the graphical security protocol;
         search, within the network for a target system that includes an activity indicator associated with one or more TTPs included in the extended graphical security protocol;
         deploy at least one countermeasure to secure the target system against the live cybersecurity threat;
         search on the network for an uncompromised system linked to the target system that does not exhibit any of the activity indicators associated with TTPs included in the extended graphical security protocol; and
         deploy at least one countermeasure to secure the uncompromised system against the live cybersecurity threat and thereby prevent the live cybersecurity threat from infecting the uncompromised system.

14. The apparatus of claim 13 wherein the microprocessor is configured to project the intrusion pathway by:
   modeling a known cybersecurity threat as applied to one or more characteristics of the network; and
   linking TTPs included in graphical security protocol about a common TTP, the common TTP being included in:
      the extended graphical security protocol; and
      the known security threat.

15. The apparatus of claim 13 wherein the microprocessor is configured to:
   project two or more intrusion pathways, each intrusion pathway comprising a subset of TTPs included in the extended graphical security protocol; and
   prioritize detection of TTPs included in two or more of the projected intrusion pathways.

* * * * *